US012318814B2

(12) United States Patent
Sommer et al.

(10) Patent No.: US 12,318,814 B2
(45) Date of Patent: Jun. 3, 2025

(54) APPARATUS AND METHOD FOR FLEXIBLE CLASSIFICATION OF POLYAND/ OR MONOCRYSTALLINE SILICON

(71) Applicant: ALZTEC GmbH, Trostberg (DE)

(72) Inventors: Herbert Sommer, Palling (DE); Ernst Hopf, Trostberg (DE)

(73) Assignee: Alztec GmbH, Trostberg (DE)

( * ) Notice: Subject to any disclaimer, the term of this patent is extended or adjusted under 35 U.S.C. 154(b) by 0 days.

(21) Appl. No.: 18/433,176

(22) Filed: Feb. 5, 2024

(65) Prior Publication Data

US 2024/0261821 A1 Aug. 8, 2024

(30) Foreign Application Priority Data

Feb. 6, 2023 (DE) ..................... 10 2023 102 854.5

(51) Int. Cl.

*B07C 5/08* (2006.01)
*B07B 1/40* (2006.01)
*B07C 5/36* (2006.01)

(52) U.S. Cl.

CPC .................. *B07C 5/08* (2013.01); *B07B 1/40* (2013.01); *B07C 5/367* (2013.01); *B07B 2220/02* (2013.01); *B07B 2230/04* (2013.01)

(58) Field of Classification Search

CPC ... B07B 1/40; B07B 2220/02; B07B 2230/04; B07C 5/08; B07C 5/367

See application file for complete search history.

(56) References Cited

U.S. PATENT DOCUMENTS

| | | | | |
|---|---|---|---|---|
| 4,627,576 A * | 12/1986 | Hahn | B07B 9/00 241/24.1 |
| 6,040,544 A | 3/2000 | Schantz et al. | |
| 6,260,712 B1 | 7/2001 | Flottmann et al. | |
| 6,265,683 B1 | 7/2001 | Flottmann et al. | |
| 6,589,332 B1 | 7/2003 | Holder et al. | |
| 6,646,218 B1 * | 11/2003 | Campbell | B07C 5/367 209/582 |
| 8,074,905 B2 | 12/2011 | Schaefer et al. | |
| 9,340,901 B2 | 5/2016 | Schaefer et al. | |
| 9,770,721 B2 | 9/2017 | Chiou et al. | |

(Continued)

FOREIGN PATENT DOCUMENTS

| | | |
|---|---|---|
| DE | 10 2005 026 419 B4 | 1/2011 |
| DE | 10 2013 218 003 A1 | 3/2015 |

(Continued)

OTHER PUBLICATIONS

Office Action issued in counterpart German Application No. 10 2023 102 854.5 dated Sep. 22, 2023, 10 pages (with English Translation).

(Continued)

*Primary Examiner* — Michael McCullough
*Assistant Examiner* — Kalyanavenkateshware Kumar
(74) *Attorney, Agent, or Firm* — Nixon & Vanderhye P.C.

(57) ABSTRACT

An apparatus which allows a flexible classification of poly- and/or monocrystalline silicon comprises a winnowing device configured to separate crushed material of poly- and/or monocrystalline silicon into a fine fraction and a coarse fraction. The apparatus also comprises an optoelectronic sorting device configured to separate the coarse fraction into at least two fractions.

23 Claims, 3 Drawing Sheets

(56) References Cited

U.S. PATENT DOCUMENTS

| | | | | |
|---|---|---|---|---|
| 10,335,832 | B2 | 7/2019 | Fricke et al. | |
| 10,478,860 | B2 | 11/2019 | Schaefer et al. | |
| 10,967,387 | B2 | 4/2021 | Chiou et al. | |
| 11,059,072 | B2 | 7/2021 | Bergmann et al. | |
| 11,154,908 | B2 | 10/2021 | Buschhardt et al. | |
| 2016/0214141 | A1* | 7/2016 | Schneider | B07B 13/18 |
| 2022/0185597 | A1* | 6/2022 | Davis | B65G 43/08 |

FOREIGN PATENT DOCUMENTS

| | | | |
|---|---|---|---|
| EP | 0876851 | B1 | 12/2001 |
| EP | 0982081 | B1 | 12/2001 |
| EP | 1131477 | B1 | 2/2003 |
| EP | 2001607 | B1 | 7/2009 |
| EP | 1842595 | B1 | 9/2009 |
| EP | 2047014 | B1 | 12/2013 |
| EP | 2830740 | B1 | 3/2020 |
| EP | 3310499 | B1 | 11/2020 |
| EP | 3283237 | B1 | 10/2021 |
| EP | 3554723 | B1 | 11/2022 |

OTHER PUBLICATIONS

Decision to Grant issued in counterpart German Application No. 10 2023 102 854.5 dated Jan. 25, 2024, 9 pages (with English Translation).

* cited by examiner

APPARATUS AND METHOD FOR FLEXIBLE CLASSIFICATION OF POLYAND/ OR MONOCRYSTALLINE SILICON

CROSS-REFERENCE TO RELATED APPLICATION

Priority is claimed from DE 10 2023 102 854.5 filed in Germany on Feb. 6, 2023, incorporated herein by reference.

FIELD

The technology relates to an apparatus and a method for flexible classification of poly- and/or monocrystalline silicon.

BACKGROUND

In the semiconductor industry, silicon is an important raw material for the production of integrated circuits. These integrated circuits are built on a wafer, which is often made of monocrystalline silicon. The monocrystalline silicon can, for example, be produced using a crucible drawing process (e.g. Czochralski process). A crucible contains purified and molten silicon (poly- and/or monocrystalline silicon), whereby a seed crystal, which is arranged on a metal rod, is immersed in the melt. Monocrystalline silicon is deposited around the seed crystal, whereby the metal rod is slowly pulled upwards out of the melt, forming a crystal pillar known as an ingot. The crystal pillar consists of monocrystalline silicon. The crystal pillar is then sawn into individual wafers. The crucible itself can be filled with polycrystalline silicon, which is produced using the Siemens process, for example. Monocrystalline silicon can also be added to the crucible, which is left over when the wafers are cut to size, for example. The ingot has a round cross-sectional shape, whereas wafers that are used in solar cells usually have a rectangular cross-sectional shape, which is the result of cutting a round wafer to size. The crucible must have a high bulk density and is therefore filled with poly- and/or monocrystalline silicon of different fractions, i.e. sizes, whereby pieces that are too small or too large have a negative effect on the melting behavior in the crucible. Therefore, the poly- and/or monocrystalline silicon is broken into smaller fractions by a crusher before being filled into the crucible, whereby these fractions are then classified, in other words sorted according to size.

A device for classifying polycrystalline silicon is known from EP 2 001 607 B1. The device comprises a mechanical screening system and an optoelectronic sorting system. The poly crush is separated into a silicon fine fraction and a silicon remainder fraction by the mechanical screening system. Only the silicon remainder fraction is separated into further fractions by an optoelectronic sorting system.

A disadvantage of EP 2 001 607 B1 is that the entire poly crush is fed to the mechanical screening system. For example, silicon rods produced using the Siemens process are crushed in a crusher and pieces of different sizes are fed to the mechanical screening system as poly crush. The fact that large pieces of polycrystalline silicon are also fed into the mechanical screening system means that the mechanical screening system is subject to heavy wear and tear and the risk of foreign objects resulting from the wear of the mechanical screening system is increased. These foreign objects have to be detected and removed at great expense, as otherwise the crystal pillar produced in the crucible drawing process is unusable. Furthermore, the mechanical screening system has to be repaired frequently, which in turn leads to a standstill of the system.

SUMMARY

Example embodiments provide an apparatus and a method for flexible classification of poly- and/or monocrystalline silicon, in which the amount of unwanted particles entering the classified fractions is prevented or significantly reduced. Apparatus for flexible classification of poly- and/or monocrystalline silicon and a method for flexible classification of poly- and/or monocrystalline silicon are provided.

BRIEF DESCRIPTION OF THE DRAWINGS

Embodiments herein are described purely by way of example with reference to the following drawings.

DETAILED DESCRIPTION OF EXAMPLE NON-LIMITING EMBODIMENTS

Figure 1:
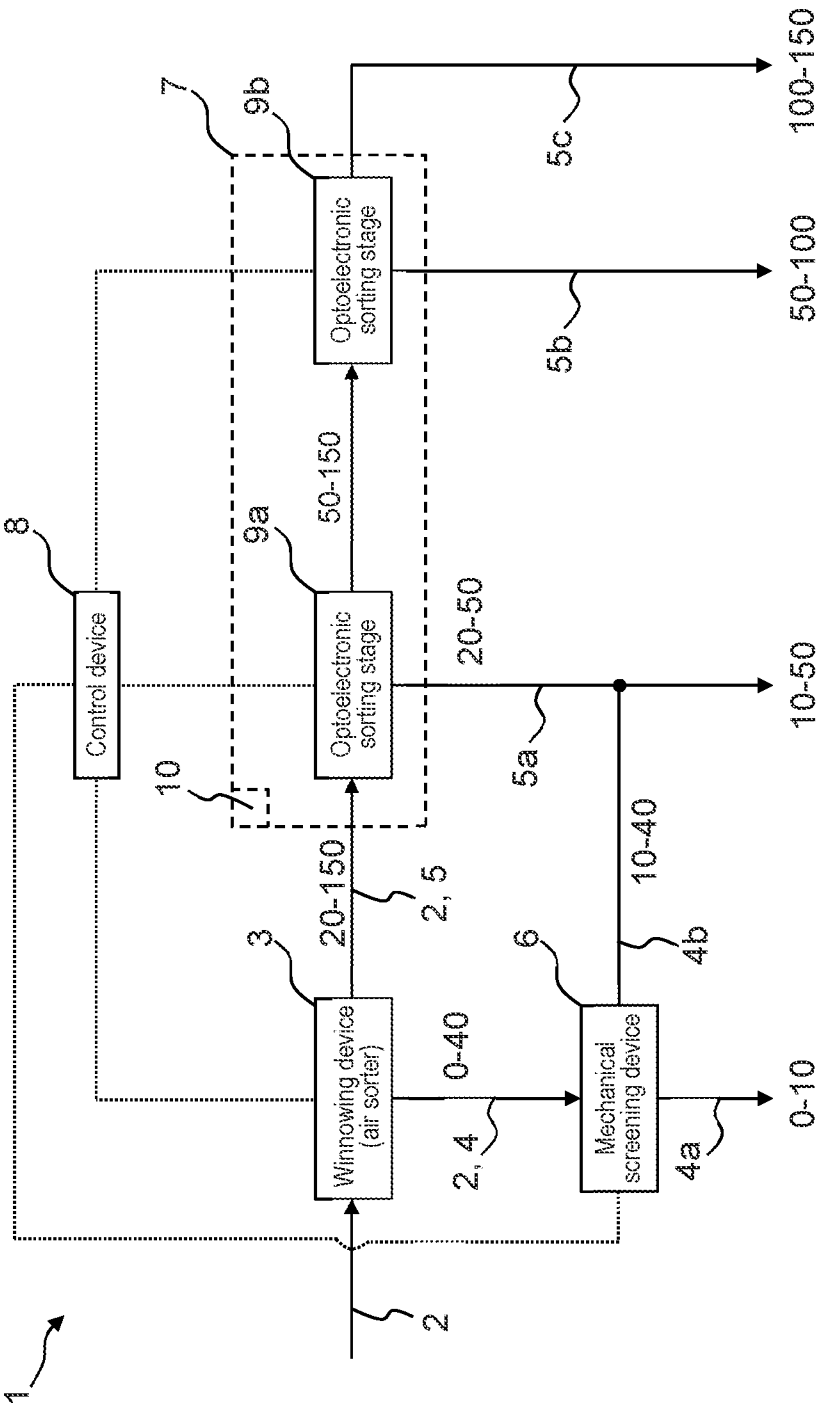
FIGS. 1, 2: embodiments of an apparatus with a winnowing device, a mechanical screening device and an optoelectronic sorting device, which enable flexible classification of poly- and/or monocrystalline silicon.

The apparatus permits flexible classification of poly- and/or monocrystalline silicon. The apparatus comprises a winnowing device which is configured to separate crushed material of poly- and/or monocrystalline silicon into a fine fraction and a coarse fraction. In addition, an optoelectronic sorting device is provided, to which the coarse fraction can be fed and which is configured to separate the coarse fraction into at least two fractions. It is particularly advantageous that only the coarse part can be fed to the optoelectronic sorting device. If the fine fraction in the optoelectronic sorting device is too high, it is otherwise difficult to sort the coarse fraction into different fractions. It is particularly advantageous that the fine fraction is not separated from the coarse fraction by a mechanical screening device, but by the winnowing device, whereby less abrasion (contamination, foreign particles) occurs during winnowing, especially of larger parts, compared to a mechanical screening device. The winnowing device can also be named as air sorter.

In an advantageous embodiment, the apparatus comprises a mechanical screening device to which the fine fraction is feedable and which is configured to separate the fine fraction into at least two fractions. It is particularly advantageous that only the fine fraction is feedable to the mechanical screening device. The fine fraction comprises on average smaller pieces of poly- and/or monocrystalline silicon compared to the coarse fraction. The fact that only the fine fraction is feedable to the mechanical screening device means that the mechanical screening device is subjected to significantly less mechanical stress than the mechanical screening device from the prior art (EP 2 001 607 B1), which reduces wear on the mechanical screening device and thus reduces the risk of foreign particles being added to the classified (sorted) poly- and/or monocrystalline silicon.

In an advantageous embodiment, the apparatus is free of an optoelectronic sorting system, which is arranged downstream of the mechanical screening device. The fine fraction is therefore not classified again by an optoelectronic sorting system. This reduces the costs.

In an advantageous embodiment, the mechanical screening device and the optoelectronic sorting device are configured to be operated simultaneously. In this case, the fine fraction and coarse fraction coming from the winnowing device are further separated into at least two fractions at the same time by the mechanical screening device and the optoelectronic sorting device. This leads to a high output.

In an advantageous embodiment, the mechanical screening device comprises at least one screening stage. The at least one screening stage is a linear vibrating screen, a circular vibrating screen or a flip-flow screen. This allows an efficient separation of the fine fraction into several fractions. Different types of screens can be used for several screening stages. All screening stages can also comprise the same type of screen.

In an advantageous embodiment, the mechanical screening device comprises at least one screening stage, wherein the part of the at least one screening stage which can be brought into contact with the poly- and/or monocrystalline silicon during operation is made of a plastic or comprises a plastic. This reduces wear on the mechanical screening device. In particular, the risk of foreign particles contaminating the classified poly- and/or monocrystalline silicon due to wear of the mechanical screening device is reduced.

In an advantageous embodiment, the plastic is polyurethane. This further reduces wear on the mechanical screening device.

In an advantageous embodiment, the plastic has a hardness which is greater than 60 Shore(A), 65 Shore(A), 70 Shore(A), 75 Shore(A), 80 Shore(A) or which is greater than 85 Shore(A) and which is preferably smaller than 100 Shore(A). This further reduces wear on the mechanical screening device.

In an advantageous embodiment, the mechanical screening device comprises one, two, three or more than three screening stages to separate the fine fraction into two, three, four or more than four fractions with different dimensions. As a result, fine fractions are available in many fractions so that the crucible can be filled with a high bulk density.

In an advantageous embodiment, a first fraction of the fine fraction comprises pieces of poly- and/or monocrystalline silicon, wherein the predominant or the complete number of the pieces comprise a length which is in the range of 0 to 10 mm. A second fraction of the fine fraction comprises pieces of poly- and/or monocrystalline silicon, wherein the predominant or complete number of pieces comprise a length that is in the range of 10 to 40 mm. This provides a fraction with which even small gaps in the crucible can be optimally filled.

In an advantageous embodiment, the apparatus is configured to collect the fractions of the fine fraction with the largest dimensions and the fractions of the coarse fraction with the smallest dimensions in the same container and/or to pack them together. These fractions may partially overlap depending on the number of stages of the winnowing device and the way in which part of the fine fraction falls through the winnowing device (e.g. behind a coarse fraction), so that packaging in a common bag is advantageous.

In an advantageous embodiment, a packaging device is provided. The packaging device is configured to pack the respective fractions of the fine fraction of poly- and/or monocrystalline silicon and the respective fractions of the coarse fraction of poly- and/or monocrystalline silicon into bags and to weld (seal) the bags. This allows the crucible to be filled with the correct fractions, ensuring that no impurities are added.

In an advantageous embodiment, the fine fraction comprises pieces of poly- and/or monocrystalline silicon, the predominant number or the total number of the pieces comprise a length in the range of 0 to 40 mm. The length of a piece is defined as the longest straight line between two points on the surface of the piece. In an advantageous embodiment, the coarse fraction comprises pieces of poly- and/or monocrystalline silicon, the predominant number or the total number of the pieces comprise a length which is larger than 20 mm, 30 mm or larger than 40 mm and which is preferably smaller than 150 mm. The length of a piece is defined as the longest straight line between two points on the surface of the piece.

In an advantageous further development, the winnowing device comprises a separating unit, wherein the separating unit has at least one separating edge, wherein the separating edge separates a first region from a second region. The winnowing device comprises a blowing device, wherein the blowing device is configured to generate an air stream and to blow the fine fraction into the first region by means of the air stream. Preferably, only the fine fraction is blown into the first region. The fine fraction is blown out of the crushed material (material stream) of poly- and/or monocrystalline silicon in the free fall of the poly- and/or monocrystalline silicon. The blowing device is arranged above the separating edge in the direction of fall of the poly- and/or monocrystalline silicon. The blowing device preferably extends over the entire length or over the predominant length of the separating edge along the separating edge. The strength of the air stream is selected such that it is not sufficient to blow the coarse fraction or more than 10% of the coarse fraction into the first region. The coarse fraction is therefore not deflected by the air stream over the separating edge in such a way that it falls into the first region. The coarse fraction therefore falls into the second region.

In an advantageous embodiment, a control device is provided, wherein the control device is configured to control the blowing device in such a way that the air stream has a defined air strength. The air strength is selected in such a way that only or predominantly the fine fraction is blown into the first region. The coarse fraction falls into the second region following the force of gravity. The control device can also receive data from the optoelectronic sorting device in order to adjust the air stream based on this data. If the optoelectronic sorting device, in particular in a first optoelectronic sorting stage, detects a fine fraction that exceeds a certain threshold value (can also be zero), this is communicated to the control device, which in turn increases the air strength of the air stream. Conversely, the air strength can also be reduced if, for example, it is determined by visual inspection that some of the coarse fraction is being fed to the mechanical screening device. In addition or as an alternative to a visual inspection and manual selection of the air strength, the control device can also reduce the air strength until a certain fine fraction is present in the optoelectronic sorting device, in particular in the first optoelectronic sorting stage.

In an advantageous embodiment, the blowing device is configured to generate the air stream in such a way that the width of the air stream corresponds approximately to the length of the separating edge or deviates by less than 30% from the length of the separating edge. The air strength of the air stream is approximately constant along its width. The wording "approximately" means that the air strength of the air stream can deviate by a maximum of 20% or by a maximum of 10% or by a maximum of 5% along its width. This achieves a particularly precise separation between fine fraction and coarse fraction.

In an advantageous embodiment, the separating unit is in cross-section triangular or approximates a triangular shape or is n-corner shaped (n≥3). Additionally or alternatively, the separating edge consists of or comprises carbide, in particular tungsten carbide. Such a material is very low-wear, so that contamination of the poly- and/or monocrystalline silicon is reduced or completely avoided. Alternatively, the separating edge can also be made of a plastic or comprise such a plastic, in particular polyurethane, with a hardness greater than 60 Shore(A).

In an advantageous embodiment, the optoelectronic sorting device comprises one, two, three or more than three optoelectronic sorting stages to separate the coarse fraction into two, three, four or more than four fractions with different dimensions. As a result, coarse fractions are available in many fractions so that the crucible can be filled with a high bulk density.

In an advantageous embodiment, a first fraction of the coarse fraction comprises pieces of poly- and/or monocrystalline silicon, wherein the predominant or complete number of the pieces comprise a length which is in the range from 20 to 50 mm. A second fraction of the coarse fraction comprises pieces of poly- and/or monocrystalline silicon, wherein the predominant or complete number of pieces comprise a length that is in the range of 50 to 100 mm. A third fraction of the coarse fraction comprises pieces of poly- and/or monocrystalline silicon, wherein the predominant or complete number of pieces comprise a length that is in the range of 100 to 150 mm. As a result, fractions are provided with which the crucible can be filled quickly and optimally. The large fractions also ensure that the effective surface area for the heat input is not too large and that the poly- and/or monocrystalline silicon can be melted safely.

In an advantageous embodiment, the optoelectronic sorting device comprises at least one control and processing device and at least one first optoelectronic sorting stage, wherein the at least one first optoelectronic sorting stage has a camera device, a blow-out device and a separating unit. The separating unit comprises at least one separating edge, wherein the separating edge separates a first region from a second region. The coarse fraction of poly- and/or monocrystalline silicon is feedable to the at least one first optoelectronic sorting stage in free fall. The camera device is configured to generate images of fractions of the coarse fraction of poly- and/or monocrystalline silicon and transmit them to the control and processing device. The images are preferably generated in the free fall of the coarse fraction. The control and processing device is configured to classify the individual fractions from the images, in particular to measure them. The control and processing device is configured to control the blow-out device in such a way that it blows the fraction that has certain properties into the first region in free fall, whereas the at least one other fraction falls into the second region only due to the free fall. The use of the first optoelectronic sorting stage is particularly advantageous because at least one fraction can be blown out of the coarse fraction particularly quickly and reliably. Preferably, in the at least one first optoelectronic sorting stage or in each optoelectronic sorting stage, the fraction with a size, in particular length, that is below a threshold or the fraction that is smaller than the at least one other fraction is always blown out.

In an advantageous embodiment, the separating unit of the at least one first optoelectronic sorting stage is in cross-section triangular or approximates a triangular shape or is n-corner-shaped. Additionally or alternatively, the separating edge of the separating unit consists of or comprises carbide, in particular tungsten carbide. Such a material is very low-wear, so that contamination of the poly- and/or monocrystalline silicon is reduced or completely avoided. Alternatively, the separating edge of the separating unit can also be made of a plastic, in particular polyurethane with a hardness greater than 60 Shore(A), or comprise such a plastic.

In an advantageous embodiment, the optoelectronic sorting device comprises at least a second optoelectronic sorting stage. The at least one second optoelectronic sorting stage is arranged after the first optoelectronic sorting stage, wherein fractions of the coarse fraction of poly- and/or monocrystalline silicon, which the first optoelectronic sorting stage has sorted into the second region, are feedable to the at least one second optoelectronic sorting stage. This allows finer sorting.

A method allows a flexible classification of poly- and/or monocrystalline silicon, in particular by using the apparatus described. In a first method step, crushed material of poly- and/or monocrystalline silicon is separated into a fine fraction and a coarse fraction by means of a winnowing device. In a second method step, the coarse fraction is separated into at least two fractions by means of an optoelectronic sorting device.

In an advantageous embodiment, the method comprises a third method step. In the third method step, the fine fraction is separated into at least two fractions by means of a mechanical screening device. The second and third method steps can be executed in parallel. The fact that only the fine fraction is feedable to the mechanical screening device means that the mechanical screening device is less subject to wear, which reduces the risk of foreign particles that can occur as a result of wear on the mechanical screening device, for example.

FIG. 1 shows a functional diagram which explains how the apparatus 1 functions in order to achieve a classification of crushed material 2 of poly- and/or monocrystalline silicon. The solid line shows the material flow of the crushed material 2 of poly- and/or monocrystalline silicon, while the dotted line visualizes control signals.

The crushed material 2 of poly- and/or monocrystalline silicon is transferred to apparatus 1 on the left-hand side. The crushed material 2 can be produced by a crusher which is not shown. The apparatus 1 comprises a winnowing device 3 which is configured to separate the crushed material 2 into a fine fraction 4 and a coarse fraction 5. The apparatus 1 further comprises a mechanical screening device 6 which is configured to separate the fine fraction 4 into at least two fractions 4*a*, 4*b*. The apparatus 1 additionally comprises an optoelectronic sorting device 7, which is configured to separate the coarse fraction 5 into at least two fractions 5*a*, 5*b*. In FIG. 1, the coarse fraction 5 is separated into three fractions 5*a*, 5*b*, 5*c*.

The winnowing device 3 comprises one or more speed-controlled blowers. The winnowing device 3 is configured to generate an air stream with a width of approximately 700 mm. This allows approximately 2000 kg/h of crushed material 2 to be separated into a fine fraction 4 and a coarse fraction 5.

Furthermore, a control device 8 is provided, which is configured to control the winnowing device 3, the mechanical screening device 6 and the optoelectronic sorting device 7. The control device 8 can be a single control device. It is also possible for the control device 8 to comprise several control units that can be operated independently of one another. In this case, the winnowing device 3 can be controlled by its own control unit. The same can be true for the mechanical screening device 6 and/or the optoelectronic sorting device 7.

It is particularly advantageous that the mechanical screening device 6 and the optoelectronic sorting device 7 are configured to be operated simultaneously.

The fine fraction 4 comprises pieces of poly- and/or monocrystalline silicon that comprise a length that lies in the range of 0 to 40 mm. The first fraction 4*a* of the fine fraction 4 comprises pieces of poly- and/or monocrystalline silicon that comprise a length that is in the range of 0 to 10 mm. The second fraction 4*b* of the fine fraction 4 comprises pieces of poly- and/or monocrystalline silicon that comprise a length that is in the range of 10 to 40 mm.

The coarse fraction 5 comprises pieces of poly- and/or monocrystalline silicon that comprise a length that is in the range of 20 to 150 mm. The first fraction 5*a* of the coarse fraction 5 comprises pieces of poly- and/or mono-crystalline silicon that comprise a length that is in the range of 20 to 50 mm. The second fraction 5*b* of the coarse fraction 5 comprises pieces of poly- and/or mono-crystalline silicon that comprise a length that is in the range of 50 to 100 mm. The third fraction 5*a* of the coarse fraction 5 comprises pieces of poly- and/or mono-crystalline silicon that comprise a length that is in the range of 100 to 150 mm.

In this embodiment, the optoelectronic sorting device 7 comprises two optoelectronic sorting stages 9*a*, 9*b* to separate the coarse fraction 5 into three fractions 5*a*, 5*b*, 5*c* with different dimensions. The optoelectronic sorting device 7 preferably comprises a control and processing device 10. In principle, the control and processing device 10 could also be the control device 8. Preferably, however, the control and processing device 10 is a separate device.

It is also shown that the apparatus 1 is configured to output the second fraction 4*b* of the fine fraction 4 and the first fraction 5*a* of the coarse fraction 5 together. More specifically, the apparatus 1 is configured to collect and output the fraction 4*b* of the fine fraction 4 with the largest dimensions and the fraction 5*a* of the coarse fraction 5 with the smallest dimensions together.

Figure 2:
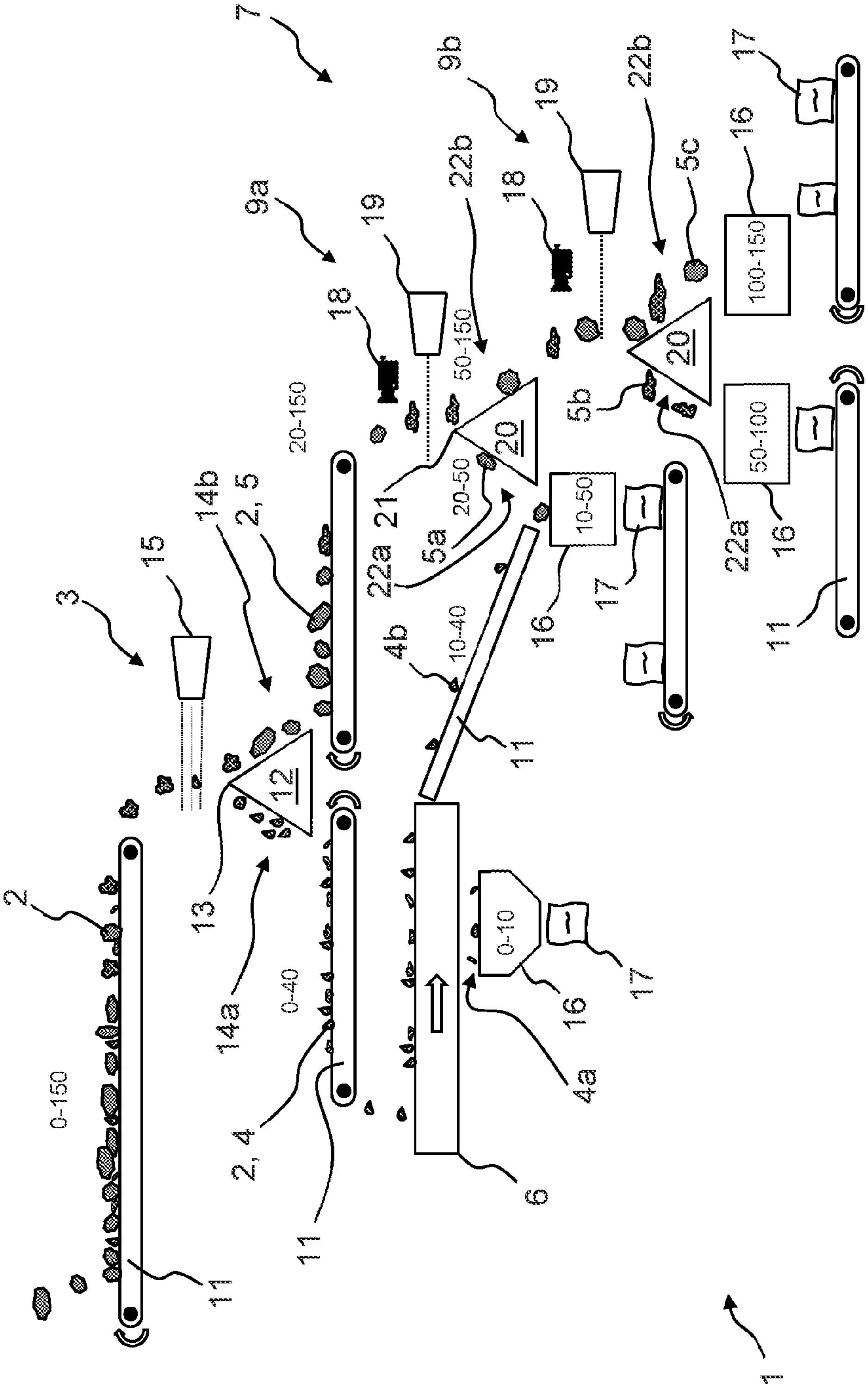

FIG. 2 explains the structure of the individual functional blocks from FIG. 1 in more detail. The crushed material 2 of poly- and/or mono-crystalline silicon is fed from a crusher (not shown) to the winnowing device 3 via a conveyor 11, in particular in the form of a conveyor belt.

The winnowing device 3 comprises a separating unit 12, wherein the separating unit 12 comprises at least one separating edge 13. The separating edge 13 separates a first region 14*a* from a second region 14*b*. The separating edge 13 can be pointed or rounded. The winnowing device 3 comprises a blowing device 15 configured to generate an air stream and to blow the fine fraction 4 into the first region 14*a* by means of the air stream. The blowing device 15 is arranged above the separating edge 13 in the direction of fall of the crushed material 2 of poly- and/or monocrystalline silicon.

The control device 8 is preferably configured to control the blowing device 15 in such a way that the air stream has a defined air strength. The width of the air stream preferably corresponds to the length of the separating edge 13, which comes into contact with the crushed material 2 of poly- and/or monocrystalline silicon.

In this embodiment, the separating unit 12 comprises a triangular cross-section. Other cross-sectional shapes are possible.

In particular, the separating edge 13 consists of or comprises a hard metal, in particular tungsten carbide. The separating edge 13 can also consist of or comprise a plastic. The plastic is preferably polyurethane and should preferably have a hardness greater than 60 Shore(A).

The fine fraction 4 is fed to the mechanical screening device 6 directly or via a conveyor 11, in this case in the form of a conveyor belt. Instead of a conveyor belt, a corresponding slide can also be used. In the case of a "direct" feed, the fine fraction 4 would fall directly from the first region 14*a* into the mechanical screening device 6.

The mechanical screening device 6 comprises at least one screening stage, wherein the at least one screening stage is a linear vibrating screen, circular vibrating screen or a flip-flow screen. The part of the at least one screening stage that can be brought into contact with the poly- and/or monocrystalline silicon during operation is made of a plastic or comprises a plastic. Preferably, the plastic is polyurethane. Preferably, the plastic has a hardness which is greater than 60 Shore(A), 65 Shore(A), 70 Shore(A), 75 Shore(A), 80 Shore(A) or which is greater than 85 Shore(A).

The device 1 also comprises a packaging device 16. The packaging device 16 is configured to package the first fraction 4*a* of the fine fraction 4 of poly- and/or monocrystalline silicon in a bag 17 and to weld (seal) the bag 17.

The second fraction 4*b* of the fine fraction 4 is packed with the first fraction 5*a* of the coarse fraction 5 in a common bag 17. For this purpose, the mechanical screening device 6 is connected via a conveyor 11, in this case in the form of a conveyor slide, to another part of the packaging device 16, to which the first fraction 5*a* of the coarse fraction 5 is also fed.

The coarse fraction 5, which falls through the second region 14*b* of the winnowing device 3, is fed directly or via a conveyor 11 to the optoelectronic sorting device 7. The optoelectronic sorting device 7 comprises the first optoelectronic sorting stage 9*a* and the second optoelectronic sorting stage 9*b*.

The first optoelectronic sorting stage 9*a* comprises a camera device 18, a blow-out device 19 and a separating unit 20. The separating unit 20 comprises a separating edge 21, which separates a first region 22*a* from a second region 22*b*. The same applies to the second optoelectronic sorting stage 9*b*.

The coarse fraction 5 of poly- and/or monocrystalline silicon can be fed to the first and second optoelectronic sorting stages 9*a*, 9*b* in free fall.

The camera device 18 of the respective optoelectronic sorting stage 9*a*, 9*b* is configured to generate images of the fractions 5*a*, 5*b*, 5*c* of the coarse fraction 5 of poly- and/or monocrystalline silicon and to transmit the images to the control and processing device 10.

The control and processing device 10 is configured to classify the individual fractions 5*a*, 5*b*, 5*c* from the images, in particular to measure them.

The control and processing device 10 is configured to control the blow-out device 19 of the respective optoelectronic sorting stage 9*a*, 9*b* in such a way that it blows the fraction 5*a*, 5*b* in free fall into the first region 22*a*, which has certain properties, whereas the at least one other fraction 5*c* falls into the second region 22*b* merely due to the free fall.

Specifically, this means that the first optoelectronic sorting stage 9*a* releases a first fraction 5*a* of the coarse fraction 5 into the first region 22*a* via the blow-out device 19. This first fraction 5*a* has a length of approximately 20 to 50 mm. This first fraction 5*a* is packed into a common bag 17 together with the second fraction 4*b* of the fine fraction 4, which comprises a length of approximately 10 to 40 mm.

The first optoelectronic sorting stage 9*a* allows the second fraction 5*b* and the third fraction 5*c* of the coarse fraction 5 to fall into the second region 22*b*. These fractions 5*b*, 5*c* are not blown out, but are instead fed to the second optoelectronic sorting stage 9*b*, in particular in free fall.

The second optoelectronic sorting stage 9*b* now blows out the second fraction 5*b* of the coarse fraction 5 via the blow-out device 19 into the first region 22*a*. This second fraction 5*b* has a length of approx. 50 to 100 mm. This second fraction 5*b* is packed in a bag 17.

The second optoelectronic sorting stage 9*b* allows the third fraction 5*c* of the coarse fraction 5 to fall into the second region 22*b*. This third fraction 5*c* has a length of approx. 100 to 150 mm. This third fraction 5*c* is packed in a bag 17.

Further optoelectronic sorting stages can now be added.

The blow-out device 19 comprises a plurality of blow-out nozzles which extend along the separating edge 21 and are arranged above the separating edge 21 with respect to the direction of fall of the coarse fraction 5.

Figure 3:
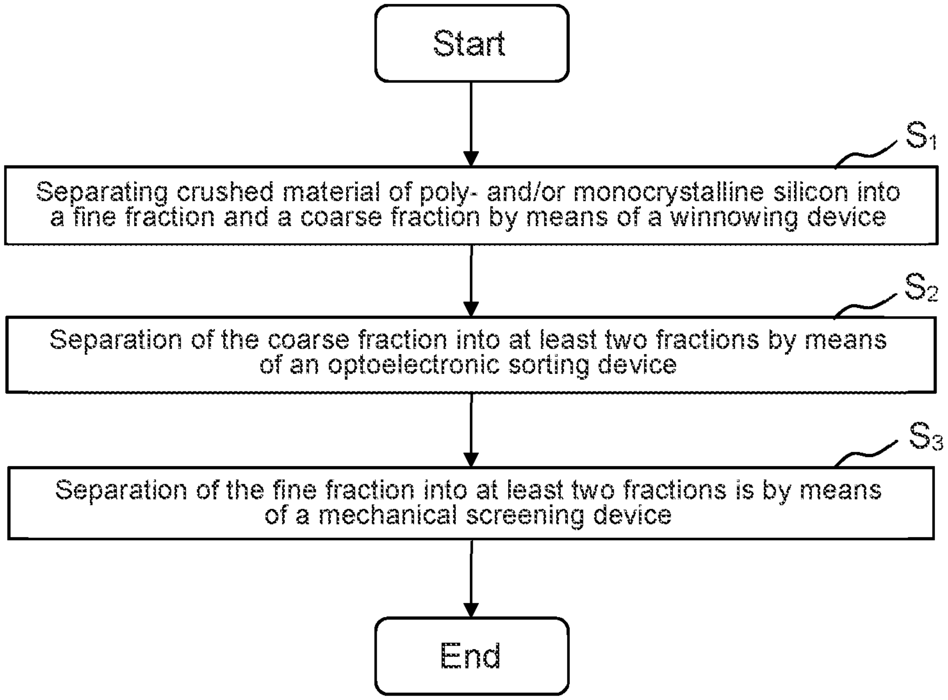
FIG. 3: a flowchart describing a method for achieving flexible classification of poly- and/or monocrystalline silicon.

FIG. 3 shows a method for flexible classification of poly- and/or monocrystalline silicon. In a first method step $S_1$, the crushed material 2 of poly- and/or monocrystalline silicon is separated into the fine fraction 4 and the coarse fraction 5 by means of the winnowing device 3. In a second method step $S_2$, the coarse fraction 5 is separated into at least two fractions 5*a*, 5*b* by means of the optoelectronic sorting device 7. In a third method step $S_3$, the fine fraction 4 is separated into at least two fractions 4*a*, 4*b* by means of the mechanical screening device 6. The method steps $S_2$ and $S_3$ can be carried out simultaneously.

The invention is not limited to the embodiments described. Within the scope of the invention, all described and/or drawn features can be combined with each other as desired.

REFERENCE SIGNS

Apparatus 1
Crushed material 2
Winnowing device (air sorter) 3
Fine fraction 4
Fractions of the fine fraction 4*a*, 4*b*
Coarse fraction 5
Fractions of the coarse fraction 5*a*, 5*b*, 5*c*
Mechanical screening device 6
Optoelectronic sorting device 7
Control device 8
Optoelectronic sorting stages 9*a*, 9*b*
Control and processing device 10
Conveyor 11 Separating unit of the winnowing device 12
Separating edge 13
First region 14*a*
Second region 14*b*
Blowing device 15
Packaging device 16
Bag 17
Camara device 18
Blow-out device 19
Separating unit of the optoelectronic sorting stage 20
Separating edge 21
First region 22*a*
Second region 22*b*
Method steps $S_1$, $S_2$, $S_3$
Alztec GmbH 006P2US

The invention claimed is:

1. An apparatus which allows a flexible classification of poly- and/or monocrystalline silicon, wherein the apparatus comprises:

a winnowing device which is configured to separate crushed material of poly- and/or monocrystalline silicon into a fine fraction and a coarse fraction, the winnowing device comprising:

a separating edge configured to separate a first region from a second region, the separating edge having a length, and a blowing device configured to generate an air stream and to blow only the fine fraction into the first region by means of the air stream, the blowing device configured to generate the air stream in such a way that the air stream has a width that corresponds to the length of the separating edge or deviates by less than 30% from the length of the separating edge, wherein an air strength of the air stream is constant along its width; and an optoelectronic sorting device which is configured to separate the coarse fraction into at least two fractions.

2. The apparatus according to claim 1, further comprising:

a mechanical screening device configured to separate the fine fraction into at least two fractions.

3. The apparatus according to claim 2, wherein:

the mechanical screening device and the optoelectronic sorting device are configured to operate simultaneously.

4. The apparatus according to claim 2, wherein:

the mechanical screening device comprises at least one screening stage, wherein the at least one screening stage is a linear vibrating screen, circular vibrating screen or a flip-flow screen.

5. The apparatus according to any of the claim 2, wherein:

the mechanical screening device comprises at least one screening stage, wherein a part of the at least one screening stage which can be brought into contact with the poly- and/or monocrystalline silicon during operation consists of a plastic or comprises a plastic.

6. The apparatus according to claim 5, wherein:

the plastic is polyurethane.

7. The apparatus according to claim 5, wherein:

the plastic has a hardness greater than 60 Shore (A), 65 Shore (A), 70 Shore (A), 75 Shore (A), 80 Shore (A) or greater than 85 Shore (A).

8. The apparatus according to claim 2, wherein:

the mechanical screening device comprises one, two, three or more than three screening stages to separate the fine fraction into two, three, four or more than four fractions with different dimensions.

9. The apparatus according to claim 2, wherein:

the apparatus is configured to collect the fraction of the fine fraction with the largest dimensions and the fraction of the coarse fraction with the smallest dimensions in the same container and/or to pack them together.

10. The apparatus according to claim 2, further comprising:

a packaging device configured to pack the respective fractions of the fine fraction of poly- and/or monocrystalline silicon and the respective fractions of the coarse fraction of poly- and/or monocrystalline silicon into bags and to weld the bags.

11. The apparatus of claim 2 wherein the apparatus is free of an optoelectronic sorting system which is arranged downstream of the mechanical screening device.

12. The apparatus according to claim 1, wherein: the fine fraction comprises pieces of poly- and/or monocrystalline silicon, wherein a predominant number of the pieces comprise a length which is in the range of 0 to 40 mm.

13. The apparatus according to claim 1, wherein: the coarse fraction comprises pieces of poly- and/or monocrystalline silicon, wherein the predominant number of the pieces comprise a length which is larger than 20 mm, 30 mm or larger than 40 mm and which is smaller than 150 mm.

14. The apparatus according to claim 1, further comprising:

a control device configured to control the blowing device in such a way that the air stream has a defined air strength.

15. The apparatus according to claim 1, wherein:

the separating unit is in cross-section triangular or approximates a triangular shape or is n-corner-shaped; and/or the separating edge consists of or comprises tungsten carbide; or the separating edge consists of or comprises a plastic.

16. The apparatus according to claim 1, wherein:

the optoelectronic sorting device comprises one, two, three or more than three optoelectronic sorting stages to separate the coarse fraction into two, three, four or more than four fractions with different dimensions.

17. The apparatus according to claim 1, wherein:

the optoelectronic sorting device comprises at least one control and processing device and at least one first optoelectronic sorting stage, wherein the at least one first optoelectronic sorting stage comprises a camera device, a blow-out device and a separating unit, wherein the separating unit comprises at least one separating edge, wherein the separating edge separates a second region from a third region;

the coarse fraction of poly- and/or monocrystalline silicon is feedable to the at least one first optoelectronic sorting stage in free fall;

the camera device is configured to generate images of fractions of the coarse fraction of poly- and/or monocrystalline silicon and to transmit them to the control and processing device;

the control and processing device is configured to classify the individual fractions from the images, in particular to measure them;

the control and processing device is configured to control the blow-out device in such a way that it blows that fraction which has certain properties into the second region in free fall, whereas at least one other fraction falls into the third region solely as a result of the free fall.

18. The apparatus according to claim 17, wherein:

the optoelectronic sorting device further comprises at least one second optoelectronic sorting stage;

the at least one second optoelectronic sorting stage is arranged after the first optoelectronic sorting stage, wherein fractions of the coarse fraction of poly- and/or monocrystalline silicon, which the first optoelectronic sorting stage has sorted into the third region, are feedable to the at least one second optoelectronic sorting stage.

19. The apparatus of claim 1 wherein the blowing device is arranged above the separating edge in the direction of fall of the poly- and/or monocrystalline silicon.

20. The apparatus of claim 1 wherein the separating edge consists of or comprises tungsten carbide.

21. The apparatus of claim 1 wherein the blowing device is configured to generate the air stream with an air strength that is insufficient to blow the coarse fraction into the first region.

22. Method for a flexible classification of poly- and/or monocrystalline silicon, wherein the method comprises:

Separating crushed material of poly- and/or monocrystalline silicon into a fine fraction and a coarse fraction by means of a winnowing device comprising a blowing device and a separating edge that separates a first region from a second region, the separating edge having a length;

generating, with the winnowing device blowing device, an air stream that blows only the fine fraction into the first region, including generating the air stream in such a way that the air stream has a width that corresponds to the length of the separating edge or deviates by less than 30% from the length of the separating edge, and an air strength of the air stream is constant along its width;

Separating of the coarse fraction into at least two fractions by means of an optoelectronic sorting device.

23. The method according to claim 22 further comprising:

Separating of the fine fraction into at least two fractions by means of a mechanical screening device.

* * * * *